United States Patent [19]
Koshimizu

[11] 4,444,436
[45] Apr. 24, 1984

[54] HYDRAULIC PRESSURE CONTROL VALVE
[75] Inventor: Naganori Koshimizu, Kanagawa, Japan
[73] Assignee: Tokico Ltd., Kanagawa, Japan
[21] Appl. No.: 316,426
[22] Filed: Oct. 29, 1981
[30] Foreign Application Priority Data
  Nov. 1, 1980 [JP] Japan .............................. 55-156816[U]
[51] Int. Cl.³ .......................... B60T 8/14; B60T 11/34
[52] U.S. Cl. .................................. 303/6 C; 188/349; 303/24 F
[58] Field of Search .............. 303/24 A, 24 C, 24 F, 303/24 R, 6 C, 6 R, 22 R, 22 A, 84 A, 84 R; 188/349, 195

[56] References Cited
U.S. PATENT DOCUMENTS

| 3,459,000 | 8/1969 | Oberthür | 303/6 C |
| 4,026,607 | 5/1977 | Hess et al. | 303/22 R X |
| 4,116,493 | 9/1978 | Hayashida | 303/24 F X |
| 4,217,005 | 8/1980 | Takata | 303/24 F |
| 4,251,117 | 2/1981 | Kubota et al. | 303/24 F |

FOREIGN PATENT DOCUMENTS

| 55-87642 | 7/1980 | Japan | 303/24 C |
| 55-164548 | 12/1980 | Japan | 303/6 C |
| 2082706 | 3/1982 | United Kingdom | 303/24 F |

Primary Examiner—Douglas C. Butler
Attorney, Agent, or Firm—Wenderoth, Lind & Ponack

[57] ABSTRACT

A hydraulic pressure control valve for use in a vehicle hydraulic braking system having first and second pressure circuits include a common valve housing, first and second pressure control mechanisms including respectively stepped pistons, valve mechanisms and inlet and outlet chambers, a spring force controlling pressure chamber normally connected to the inlet chamber of the first pressure control mechanism and transmitting the force of a spring to the pistons of the both mechanisms, and an inertia valve arranged in a passage connecting the inlet chamber of the first mechanism and the spring force controlling pressure chamber. The inertia valve closes when the deceleration of the braked vehicle exceeds a predetermined level as determined by the loading condition of the vehicle and the pressure in the inlet and outlet chambers in the respective pressure control mechanisms. Thereafter, the pistons move to close respective valve mechanisms and the pressure in respective outlet chambers increases at a rate smaller than the increase in the pressure in the inlet chambers.

1 Claim, 6 Drawing Figures

HYDRAULIC PRESSURE CONTROL VALVE

Background of the Invention

This invention relates to a hydraulic pressure control valve particularly adapted for use in a vehicle hydraulic braking system having two circuits.

A hydraulic pressure control valve is conventionally used for controlling the braking pressure applied to rear wheel brakes, thereby preventing locking or skidding of the rear wheels. Further, it is known to provide in the hydraulic pressure control valve an inertia valve to restrict or reduce the pressure supplied to the rear wheel brakes as compared with the pressure in front wheel brakes when the deceleration of the vehicle during braking exceeds a predetermined level.

When the hydraulic braking system includes two separate circuits, it is desirable to increase the pressure supplied to the rear wheel brake or brakes when either of the two circuits fails. Such requirement can be satisfied by providing two inertia valves in the respective circuits. However, there are shortcomings in that the construction of the hydraulic control valve is complicated, the dimensions thereof are bulky and the costs therefor are increased.

SUMMARY OF THE INVENTION

An object of the invention is to overcome the shortcomings aforementioned by providing a hydraulic pressure control valve for use in two separate pressure circuits and having a single inertia valve.

A hydraulic pressure control valve according to the invention comprises first and second pressure control mechanisms, each of which includes a stepped piston slidably disposed in a common valve housing to define an inlet chamber and an outlet chamber and having a connecting passage therein for connecting both chambers, and a valve mechanism for opening or closing the connecting passage in response to displacement of the stepped piston;

a spring for pressing the stepped pistons of the pressure control mechanisms in directions opening the respective valve mechanisms;

a spring force controlling pressure chamber normally connected to the inlet chamber of the first pressure control mechanism with the liquid introduced therein acting as a spring force transmitting medium between the spring and the stepped pistons, and an inertia valve provided in a passage connecting the inlet chamber of the first pressure control mechanism and the spring force controlling pressure chamber.

The inertia valve disconnects the communication between the inlet chamber of the first pressure control mechanism and the spring force controlling pressure chamber when the deceleration of the vehicle during braking exceeds a predetermined level. Thus, when the pressure in the inlet chambers increases further, the stepped pistons move to close the respective valve mechanisms, thereby decreasing the pressure in the outlet chambers as compared with the pressure in the inlet chambers.

The pressure control valve according to the invention further comprises an additional chamber in the second pressure control mechanism, separate from the inlet and outlet chambers thereof, and the additional chamber is connected permanently with the inlet chamber of the first pressure control mechanism with the pressure introduced therein counteracting the pressure in the inlet chamber of the second control mechanism.

BRIEF DESCRIPTION OF THE DRAWINGS

Further objects and advantages of the invention will become apparent from the following description taken in conjunction with accompanying drawings, in which.

DETAILED DESCRIPTION OF THE PREFERRED EMBODIMENT

Figure 1:
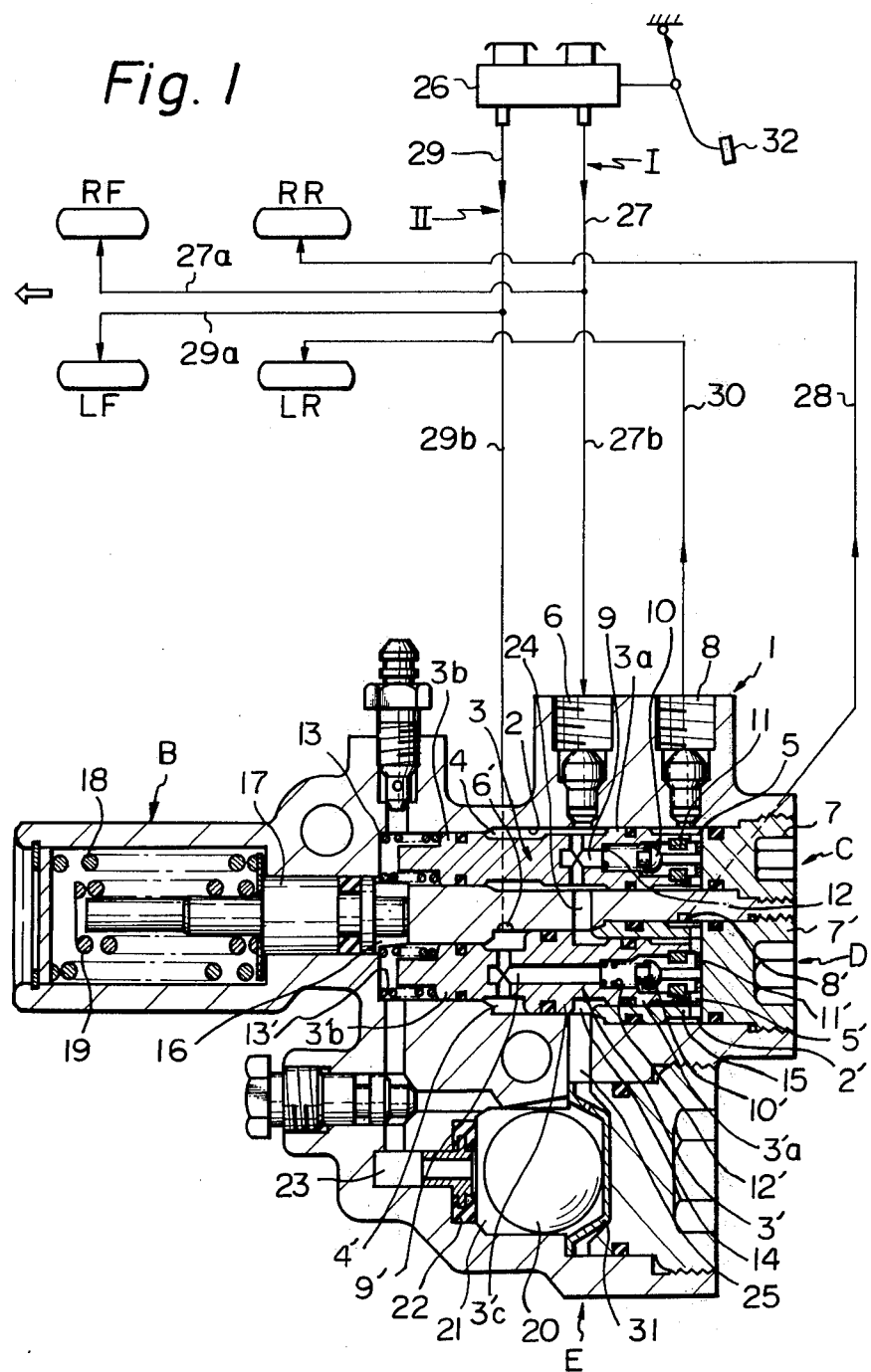
FIG. 1 is a longitudinal sectional view of a hydraulic pressure control valve according to the invention which is incorporated in a vehicle hydraulic braking system shown schematically in the drawing.
Figure 2:
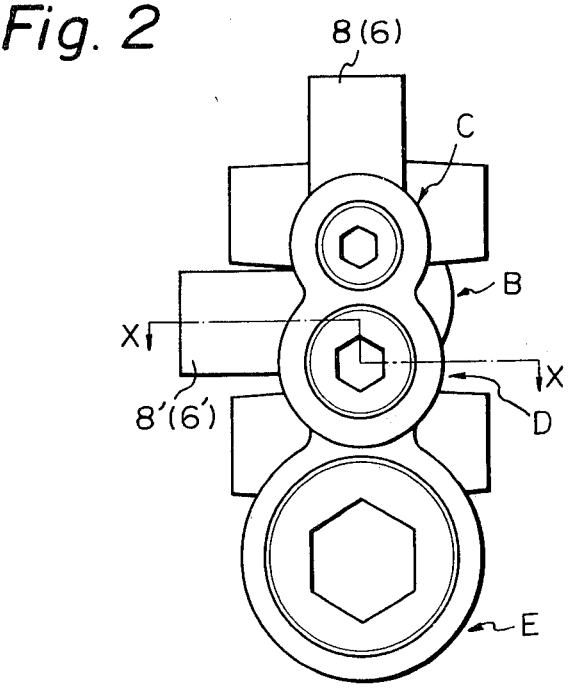
FIG. 2 is an end view of the valve of FIG. 1.
Figure 3:
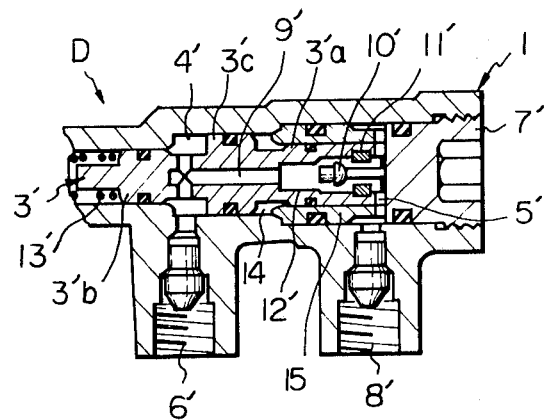
FIG. 3 is a partial sectional view taken along line X—X in FIG. 2.

The hydraulic pressure control valve shown in FIG. 1 comprises generally a valve housing 1, first and second pressure control mechanisms C and D, an inertia valve E, and a spring force controlling mechanism B.

The first pressure control mechanism C comprises a stepped bore 2 in the valve housing 1, a stepped piston 3 having a large diameter portion 3a and a small diameter portion 3b and being slidable in the stepped bore 2, an inlet chamber (first inlet chamber) 4 defined in the bore 2 and between the large and small diameter portions 3a and 3b of the piston 3, an outlet chamber (first outlet chamber) 5 defined in the bore 2 and between the large diameter portion 3a of the piston 3 and a plug 7 closing the large diameter end of the stepped bore 2, an inlet port 6 connected to the inlet chamber 4, and an outlet port 8 connected to the outlet chamber 5. The stepped piston 3 has a communicating opening 9 therein for normally communicating the inlet and outlet chambers 4 and 5. An annular valve seat 11 is secured to the piston 3 at position adjacent to the open end of an axially extending portion of the opening 9, and a valve member 10 is axially displaceably disposed in the axially extending portion of the opening 9 to cooperate with the valve seat 11 so as to open or close the opening 9. The stepped piston 3 is biased toward the plug 7 by a spring 13, and the valve member 10 is biased toward the valve seat 11 by a weak spring 12. In the nonactuated condition shown in FIG. 1, the valve member 10 is spaced from the valve seat 11 by means of a rod-shaped spacer secured to the inner end of the plug 7.

The second pressure control mechanism D is basically similar to the first pressure control mechanism C and, therefore, corresponding parts are denoted by the same reference numerals with primes attached thereto, and a detailed description thereof is omitted.

The stepped piston 3' of the second pressure control mechanism D has, in addition to the large diameter portion 3'a and the small diameter portion 3'b, an increased diameter portion 3'c between the large and small diameter portions 3'a and 3'b. As described hereinafter, the diameter of the increased diameter portion 3'c is larger than the large diameter portion 3'a, thus, a sleeve 15 is interposed between the large diameter portion 3'a and the stepped bore 2' to slidably and sealingly guide the large diameter portion 3'a. The second inlet chamber 4' is defined between the small diameter portion 3'b and the increased diameter portion 3'c, and the second outlet chamber 5' is defined between the large diameter portion 3'a and the plug 7'. Further, an additional liquid chamber 14 is defined between the increased diameter portion 3'c and the large diameter portion 3'a and is connected permanently with the first inlet chamber 4 through a passage 24, so that the liquid in the chamber 14 counteracts the liquid in the second inlet chamber 4'.

The spring force controlling mechanism B comprises a pressure chamber 16 to which the left or inner ends of both stepped pistons 3 and 3' are exposed, and a plunger 17 which is slidably and sealingly received in the housing 1 and also exposed to the pressure chamber 16. A spring 18 acts normally on the plunger 17 to urge the plunger 17 to project into the pressure chamber 16. Another spring 19 for a heavy load condition is adapted to act on the plunger 17 when the plunger 17 retracts or moves leftward by a predetermined distance. The pressure chamber 16 is normally connected with the first inlet port 6 through the first inlet chamber 4, the passage 24, the additional chamber 14 in the second pressure control mechanism D, a passage 25, the inertia valve E and a passage 23. The passages 23 and 25 will be hereinafter described in connection with the inertia valve E.

The inertia valve E comprises a spherical valve body 20, a valve chamber 21 rotatably receiving the valve body 20, a valve seat 22 cooperating with the valve body 20 to open or close the communication between the valve chamber 21 and the pressure chamber 16 of the spring force controlling mechanism through the passage 23. The valve chamber 21 is permanently connected to the additional chamber 14 of the second pressure control mechanism D through the passage 25 and an orifice which is provided in an orifice plate 31. The orifice in the orifice plate 31 prevents the stream of liquid flowing through the passage 25 from impinging onto the valve body 20. The valve body 20 is, as is well-known to those skilled in the art, normally separated from the valve seat 22 due to the gravity thereof. The housing 1 shown in the drawing is installed on the body of a vehicle at an inclined posture such that the left end of the housing 1, as viewed in FIG. 1, is directed toward the moving direction of the vehicle, and the axis of each stepped piston is inclined downwardly and rearwardly thereof. Alternately, the valve chamber 21 or guiding members (not shown) provided in the valve chamber 21 for guiding the valve member 20 may be inclined downwardly in the rightward direction as seen in FIG. 1.

The hydraulic pressure control valve as heretofore described is connected in a vehicle hydraulic braking system such as shown in FIG. 1. The system comprises a tandem master cylinder 26 acting as a source of hydraulic pressure, a first pressure circuit I consisting of lines 27, 27a and 27b connecting the master cylinder 26 with the first inlet port 6 and with a brake cylinder or cylinders in the right front wheel RF, and line 30 connecting the first outlet port 8 with a brake cylinder or cylinders in the left rear wheel(s) LR; and a second pressure circuit II consisting of lines 29, 29a and 29b connecting the master cylinder 26 with brake cylinder(s) of the left front wheel LF and the second inlet port 6', and line 28 connecting the second outlet port 8' with brake cylinder(s) of the right rear wheel(s) RR.

Figure 4:
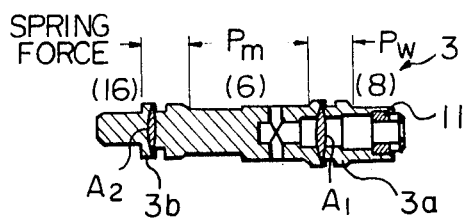
FIG. 4 is an explanatory view showing a first stepped piston in the valve of FIG. 1.
Figure 5:
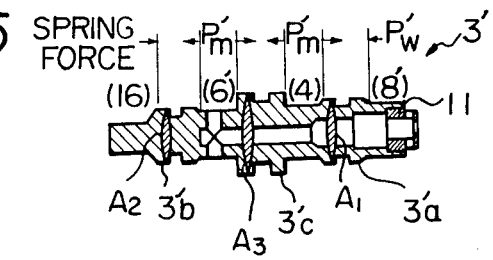
FIG. 5 is an explanatory view of a second stepped piston in the valve of FIG. 1.

The operation of the hydraulic pressure control valve will now be described. It is assumed, as shown in FIGS. 4 and 5, that the cross-sectional area of the large diameter portion 3a or 3'a of the stepped piston 3 or 3' is $A_1$ (which is equal in both pistons), the cross-sectional area of the small diameter portion 3b or 3'b of the stepped piston 3 or 3' is $A_2$ (also equal in both pistons), and the cross-sectional area of the increased diameter portion 3'c of the second stepped piston 3' is $A_3$, that Pm is pressure supplied from the master cylinder 26 and Pw is the pressure supplied to the rear wheel LR in the first pressure circuit, and that the pressures in the second pressure circuit and corresponding respectively to pressures Pm and Pw in the first pressure circuit are P'm and P'w. Further, F is a spring force of the spring 18 or the springs 18 and 19 acting on the stepped piston 3 or pistons 3 and 3' through the liquid in the chamber 16.

NORMAL OPERATING CONDITION

In depressing a brake pedal 32, the tandem master cylinder 26 generates the pressures Pm and P'm which are directly supplied to right and left front wheels RF and LF and are transmitted to left and right rear wheels through first and second pressure control mechanisms C and D, respectively, and the vehicle is braked.

When the deceleration acting on the braked vehicle is below a predetermined level, the inertia valve E does not close the communication between the first inlet port 6 and the pressure chamber 16 as shown in FIG. 1, and the stepped pistons 3 and 3' are maintained at the initial condition shown in FIG. 1, thus the pressures Pw and P'w supplied to left and right rear wheels LR and RR are equal to the pressures Pm and P'm. Namely, respective chambers 6, 8 and 16 in the first pressure control mechanism C and chambers 6', 8' 14 and 16 in the second control mechanism D are subjected to substantially the same pressure. The spring 18 is compressed by some amount due to the pressure in the chamber 16.

When the deceleration acting on the vehicle exceeds the predetermined level, the valve body 20 in the inertia valve E displaces leftward to seat on the valve seat 22 so that the pressure supply to the chamber 16 is cut off. When the brake pedal 32 is further depressed at the cut-off condition, the pressure in chambers 6, 6' and 14 increases further. The liquid confined in the pressure chamber 16 acts as a force transmitting medium between the stopped pistons 3 and 3' and the spring 18 or the springs 18 and 19.

The stepped piston 3 (3') receives a force Pm $A_2$ (P'm $A_2$) in the leftward direction as seen in FIGS. 4 and 5 and a force F in the rightward direction. Thus, in response to the increase in the pressure Pm (P'm) the piston 3 (3') moves leftward with the plunger 17 being displaced leftward until the valve member 10 (10') engages with the valve seat 11 (11'). The pressure Pm (P'm) at that condition is shown as cut-off pressure or split pressure $P_{OL}$ or $P_{OH}$ in FIG. 6.

The pressures $P_{OL}$ and $P_{OH}$ are typically shown as a lightly loaded condition and a heavily loaded condition of the vehicle. In the lightly loaded condition, the inertia valve E closes at a relatively low braking pressure and only the spring 18 acts to determine the split pressure $P_{OL}$. However, when the vehicle is heavily loaded, the inertia valve E does not close until the pressure Pm (P'm) increase further and at that condition the spring 19 also acts to determine the pressure $P_{OH}$.

Thereafter, the piston 3 receives a force in the rightward direction Pm($A_1-A_2$) +F, and in the leftward direction a force $P_w A_1$. Thus, when the pressure $P_m$ increases further, the piston 3 moves rightward by a small amount thereby increasing the pressure $P_w$ by a small amount whereby the piston 3 again moves rightward. The rate of increase in the pressure $P_w$ ($P'_w$) in rear wheels LR (RR) as compared with the pressure $P_m$ ($P'_m$) in the front wheels, or the inclination $\alpha$ (FIG. 6) is $$\tan \alpha = (A_1 - A_2)/A_1 \, ps$$

Failure in the first circuit I

When the first pressure circuit I fails, the pressure $P_m$ and $P_w$ in the circuit I is zero, and the pressure in the pressure chamber 16 also is zero. The stepped piston 3' in the second mechanism D receives a force $P'_w A_1$ in the leftward direction, and a force $P'_m(A_3-A_2)$ in the rightward direction. According to the invention, $A_3-A_2 > A_1$, thus, the piston 3' is pressed in the rightward direction, so that the pressure $P'_w$ is equal to the pressure $P'_m$, and no cut-off condition is observed. The right rear wheel receives a sufficiently large pressure $P'_w$ to compensate for the decrease in the braking force caused by the failure in the first circuit I.

It will be noted that the inertia valve E and the spring force controlling mechanism B have no function in controlling the pressure when the first pressure circuit fails.

Failure in the second circut II

Figure 6:
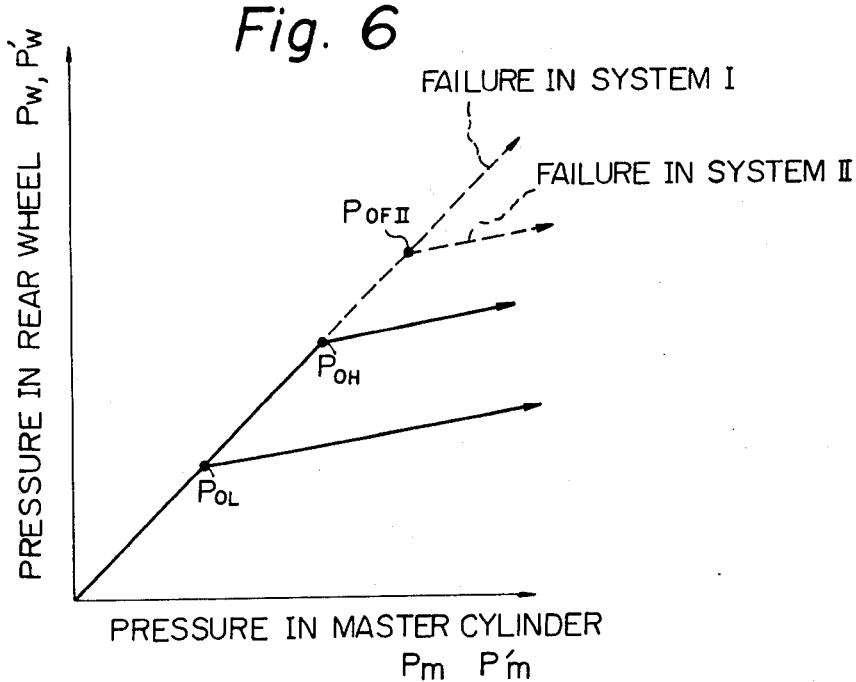
FIG. 6 is a diagram showing the relationship between the pressure in the master cylinder and the pressure in rear wheel brakes.

When the second circuit II fails, the pressure $P'_m$ and $P'_w$ is zero, and the inertia valve E does not close until the pressure $P_m$ and $P_w$ supplied to the right front wheel RF and the left rear wheel LR increases sufficiently that the split pressure $P_{OF}$ is sufficiently large compared with the pressure $P_{OL}$ or $P_{OH}$ in the normal operating condition. It will be noted that the split pressure $P_{OF}$ varies in response to the loading condition of the vehicle although only one point is shown in FIG. 6. Usually, the split pressure $P_{OF}$ is about two times of the split pressure in the normal operating condition of the vehicle being correspondingly loaded.

As described heretofore, according to the invention a single inertial valve is used to control two independent pressure circuits, and further, a decrease in the braking force due to the failure of either of the circuits can be compensated for by the remaining circuit.

The springs 13 and 13' act to overcome the sliding resistance of the pistons 3 and 3' so as to normally maintain the pistons 3 and 3' engaging with the plugs 7 and 7', however, the spring force thereof may be increased to assure a minimum required pressure to the rear wheels even if the inertia valve E should close without receiving the predetermined deceleration, such as in the case when the vehicle is traveling on a steep down-hill grade.

According to the invention, a balanced braking condition can be assured between two pressure circuits during normal operating conditions, and increased braking effort can be obtained upon the failure of either of the circuits.

What is claimed is:

1. A hydrualic pressure control valve for use in a vehicle braking system and comprising:

first and second pressure control mechanisms provided in a common valve housing, each said pressure control mechanism including a stepped piston mounted for displacement in a respective bore in said housing, an inlet chamber and an outlet chamber with fluid therein exerting pressure on the respective said piston, and a valve mechanism controlling fluid flow between said inlet chamber and said outlet chamber in response to displacement of said respective piston;

each said stepped piston having extending therethrough an opening for connecting the respective said inlet chamber and outlet chamber, and the respective said valve mechanism including a valve member for opening or closing said opening;

a spring force controlling mechanism including a spring force controlling pressure chamber normally connected to said inlet chamber of said first pressure control mechanism and receiving fluid acting as means for urging said stepped pistons of said pressure control mechanisms in directions for opening the respective said valve mechanisms, a plunger having a first end exposed to the pressure in said spring force controlling pressure chamber, a first spring normally acting on a second end of said plunger to urge said plunger toward said spring force controlling pressure chamber, and a second spring acting on said second end of said plunger to urge said plunger toward said spring force controlling pressure chamber when the displacement of said plunger exceeds a predetermined distance;

said second pressure control mechanism including an additional chamber separate from said inlet and outlet chambers thereof, said additional chamber being connected to said inlet chamber of said first pressure control mechanism and receiving therefrom fluid the pressure of which acts in opposition to the pressure in said inlet chamber of said second pressure control mechanism;

an inertia valve provided in a passage connecting said inlet chamber of said first pressure control mechanism and said spring force controlling pressure chamber, said inertia valve disconnecting communication between said inlet chamber of said first pressure control mechanism and said spring force controlling pressure chamber when the deceleration of the vehicle during a brake applying operation exceeds a predetermined level;

said first stepped piston having a small diameter portion and a large diameter portion, with said inlet chamber of said first pressure control mechanism being defined between said small and large diameter portions, and said outlet chamber of said first pressure control mechanism being separated from said inlet chamber thereof by said large diameter portion;

said second stepped piston having a small diameter portion and a large diameter portion corresponding respectively to said small and large diameter portions of said first stepped piston and an increased diameter portion larger than said large diameter portion of said second stepped piston and arranged between said small and large diameter portions of said second stepped piston, with said inlet chamber of said second pressure control mechanism being defined between said small diameter portion and said increased diameter portion of said second stepped piston, said additional chamber being defined between said increased diameter portion and said large diameter portion of said second stepped piston, and said outlet chamber of said second pressure control mechanism being separated from said additional chamber by said large diameter portion of said second stepped piston; and and small diameter portions of said first and second stepped pistons being permanently exposed to said spring force controlling pressure chamber and the pressure therein.

* * * * *